15(12) United States Patent
Assuncao et al.

US008909189B2

(10) Patent No.: US 8,909,189 B2
(45) Date of Patent: Dec. 9, 2014

(54) SYSTEM, METHOD AND PROGRAM PRODUCT FOR MAINTAINING DEPLOYED RESPONSE TEAM MEMBERS SYNCHRONIZED

(75) Inventors: Marcos Dias De Assuncao, Sao Paolo (BR); Silvia Christina Sardela Bianchi, Sao Paulo (BR); Marco Aurelio Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/570,720

(22) Filed: Aug. 9, 2012

(65) Prior Publication Data
US 2014/0045445 A1 Feb. 13, 2014

(51) Int. Cl.
*H04M 11/04* (2006.01)
(52) U.S. Cl.
USPC .................................... 455/404.1; 455/404.2
(58) Field of Classification Search
USPC ........................................... 455/404.1, 404.2
See application file for complete search history.

(56) References Cited

U.S. PATENT DOCUMENTS

| 6,970,444 | B2 * | 11/2005 | Chwieseni et al. ........... 370/338 |
| 7,174,382 | B2 | 2/2007 | Ramanathan et al. |
| 7,203,753 | B2 | 4/2007 | Yeager et al. |
| 2006/0158329 | A1 | 7/2006 | Burkley et al. |
| 2006/0223524 | A1 * | 10/2006 | Ginzburg ...................... 455/424 |
| 2007/0049295 | A1 * | 3/2007 | Soliman et al. ............ 455/456.3 |
| 2009/0131021 | A1 | 5/2009 | Vogedes et al. |
| 2009/0157814 | A1 * | 6/2009 | Lee et al. ...................... 709/204 |
| 2009/0247114 | A1 * | 10/2009 | Sennett et al. ............. 455/404.1 |
| 2009/0280787 | A1 * | 11/2009 | Chavez et al. ................ 455/417 |
| 2011/0111728 | A1 * | 5/2011 | Ferguson et al. .......... 455/404.2 |
| 2012/0295566 | A1 | 11/2012 | Collins et al. |

OTHER PUBLICATIONS

Asplund, et al. "A Partition-Tolerant Manycast Algorithm for Disaster Area Networks," 28th IEEE International Symposium on Reliable Distributed Systems, pp. 156-165, 27-30, 2009.
Nelson, et al. "Event-driven, role-based mobility in disaster recovery networks," Proceedings of the 2nd ACM workshop on Challenged networks, 2007.
Yasar, et al. "Optimizing Information Dissemination in Large Scale Mobile Peerto-Peer Networks using Context-based Grouping," 13th International IEEE Annual Conference on Intelligent Transportation Systems, 2010.
Musolesi, et al., "CAR: Context-Aware Adaptive Routing for Delay-Tolerant Mobile Networks," IEEE Transactions on Mobile Computing, vol. 8, No. 2, pp. 246-260, 2008.

(Continued)

*Primary Examiner* — Omoniyi Obayanju
(74) *Attorney, Agent, or Firm* — Law Office of Charles W. Peterson, Jr.; Louis J. Percello, Esq.

(57) ABSTRACT

An incident response system, method of responding to exigent incidents and a computer program product therefor. Local devices associated with a locale department are connected to network. An operations center on one or more networked computers, e.g., cloud computers, plans and administer locale day-to-day operations. The operations center may also plan and administer emergency operations for the locale. Locale departments have response agents associated mobile devices. The operations center assigns each mobile device with a role for responding to incidents and provides each with a likelihood table. When deployed each mobile device connects to the network individually or through other mobile devices, e.g., in an ad hoc, peer-to-peer network.

23 Claims, 10 Drawing Sheets

(56) References Cited

OTHER PUBLICATIONS

Kuhn, et al., "Adding Attributes to Role-Based Access Control," IEEE Computer, vol. 43, No. 6, pp. 79-81, Jun. 2010.
Jelasity, et al., "The peer sampling service: Experimental evaluation of unstructured gossip-based implementations," In Hans-Arno Jacobsen, editor, Middleware 2004, vol. 3231 of Lecture Notes in Computer Science, pp. 79-98, 2004.
Zhong, et al., "Non-uniform random membership management in peer-to-peer networks," IEEE INFOCOM, 2005.
Chen, et al., "Fast gossip-based overlay construction by adaptive membership exchange," 2nd International Conference on Networking and Digital Society, vol. 1, no., pp. 21-24, 2010.
www-01.ibm.com/software/industry/intelligent-oper-center/, copyright IBM corporation 2011.
www-01.ibm.com/software/industry/intelligent-opercenter/features/?S_CMP=wspace, Jul. 25, 2012.

* cited by examiner

SYSTEM, METHOD AND PROGRAM PRODUCT FOR MAINTAINING DEPLOYED RESPONSE TEAM MEMBERS SYNCHRONIZED

BACKGROUND OF THE INVENTION

1. Field of the Invention

The present invention is related to response systems and methods, and, more particularly to maintaining network connectivity between an operation center and deployed agents, e.g., members of an emergency response team, even in areas that have become otherwise inaccessible while responding to an incident.

2. Background Description

A typical autonomous modern locale, such as a city, county or state, has a complex infrastructure that includes newer technologies, extending well beyond roads and traditional utilities, e.g., water, gas and electric. Newer infrastructure technologies include, for example, wired and wireless communications networks (such as, cellular networks) and data networks, e.g., intranets and the Internet. Including these newer technologies has allowed locales to avail themselves of new communications technologies as well, such as text messaging and social media, e.g., Twitter, Facebook and Myspace. These newer technologies have enabled locale department planners and managers to manage local resources and respond to local emergencies that arise, e.g., from adverse weather conditions and natural disasters. Accordingly, some locales are setting up operation centers, such as the IBM Intelligent Operations Center, to efficiently leverage these state of the art technologies to monitor and manage services for the location, e.g., police, fire departments, traffic management and weather.

A state of the art operation center can facilitate proactively addressing local emergencies as well. A typical state of the art operation center may include an emergency capability. The operation center emergency capability facilitates departments in collecting and processing information from a range of location services and simulation engines. Sources of this information include, for example, police, fire departments, traffic management systems, weather forecasts, and flooding simulation.

Department management uses the operation center in analyzing processed information and potential emergency situations to plan for emergencies. Departments designate in the system teams of agents responsible for activities in an emergency, e.g., emergency management and response teams. In an emergency, the operation center facilitates the response in deploying designated personnel in the field to respond to, and minimize the impact of, any emergency.

It is essential to keep team members current during the emergency. Since the operation center coordinates and manages the emergency, therefore, team members must be able to remain connected, both to receive updates and to report updates to the operation center. The agents also must be able to communicate and coordinate with each other. Communications in an emergency, however, are likely to be impaired. Affected areas may experience bad network connectivity and difficult road conditions. The emergency may render endangered areas completely inaccessible and makes team member communications haphazard and at times unreliable.

There is a need for maintaining network connectivity between the operation center and deployed agents even in severely compromised situations; and, more particularly for maintaining communications between the operation center and deployed agents responding to an emergency, such as an earthquake or flooding, even in areas that have become otherwise inaccessible.

SUMMARY OF THE INVENTION

A feature of the invention is improved connectivity for response team members;

Another feature of the invention is improved data synchronization between response team members and an operations control center;

Yet another feature of the invention is improved connectivity for, and data synchronization between, emergency response team members and an emergency operations control center.

The present invention relates to an incident response system, method of responding to exigent incidents and a computer program product therefor. Local devices associated with a locale department are connected to network. An operations center on one or more networked computers, e.g., cloud computers, plans and administer locale day-to-day operations. The operations center may also plan and administer emergency operations for the locale. Locale departments have response agents associated mobile devices. The operations center assigns each mobile device with a role for responding to incidents and provides each with a likelihood table. When deployed each mobile device connects to the network individually or through other mobile devices, e.g., in an ad hoc, peer-to-peer network.

Embodiments of the invention include:

An incident response method comprising: receiving in an operations center an indication of the occurrence of an incident in a locale, one or more computers providing said operations center, said operations center serving said locale; assigning roles to mobile devices networked with said one or more computers, each mobile device being associated with one of a plurality of agents, each agent being associated with one of a plurality of individual departments serving said locale; monitoring in said operations center for an indication of the occurrence of an incident; deploying one or more response teams responsive to said indication, each response team including some of said plurality of agents; and organizing deployed mobile devices in an ad hoc peer-to-peer network passing incident related messages between neighboring peers in combined push/pull communications.

In this embodiment assigning roles may comprise: providing said each mobile device with an assigned region of interest and a role model indicating including attributes describing said assigned role; and providing said each mobile device with a likelihood table, said likelihood table mapping the interaction probability of each peer with other peers based on the respective peers' roles. Role model attributes may provide information on performing a respective given role, and assigning roles further comprises indicating roles and regions of interest associated with each peer to all peers across said ad hoc peer-to-peer network. The operations center may include an emergency operations center (EOC), at least one deployed said peer remaining connected to said EOC, said deployed mobile devices connecting wirelessly to each other in a said ad hoc peer-to-peer network and organized hierarchically according to role. Wirelessly connecting a mobile device as a peer to said ad hoc peer-to-peer network may comprise: connecting to neighboring peers; identifying said neighboring peers; and broadcasting role and region of interest associated with the connecting mobile device.

Combined push/pull communications may comprise each peer: waiting for push communication messages from neighboring peers; receiving a push communication message; determining if role information is being requested from the respective peer by one or more neighboring peers; sending the peer's role information and assigned region of interest to every requesting peer; and returning to waiting for push communication messages. Whenever role information is not being requested, said combined push/pull communications further comprises said each peer: determining if the message is an update of a neighboring agent's information; storing said update of said neighboring peer's role information and assigned region of interest; and returning to waiting for push communication messages. Whenever the message is not an update, said each peer returns to waiting for push communication messages. Whenever a timeout occurs before receiving a push communication message, said combined push/pull communications further comprises sending requests for updated information to neighboring peers.

The one or more computers may be cloud computers with the plurality of mobile devices being cloud clients. The method may further include provisioning said operations center on said cloud computers, said operations center planning and administering day-to-day operations by said plurality of individual departments including law enforcement, medical and fire and rescue departments; provisioning an emergency operations center (EOC) on said cloud computers, said EOC planning and administering emergency operations by said plurality of individual departments for said locale; receiving incident data and information from said plurality of individual departments; identifying incidents from received incident data and information; generating a response plan for each identified incident; and waiting for each said incident.

An incident response method comprising: planning and administering day-to-day operations for a plurality of locale departments by an operations center on a plurality of provider computers; planning and administering emergency operations for said plurality of locale departments by an emergency operations center (EOC) on said plurality of provider computers; generating a response plan for each identified incident from incidents identified from incident data and information from said plurality of locale departments; receiving an indication of the occurrence of an incident in said locale; assigning roles to mobile devices networked with said one or more computers, each mobile device being associated with one of a plurality of agents, each agent being associated with one of said plurality of locale departments; monitoring for an indication of the occurrence of an incident affecting said locale; deploying one or more response teams responsive to said indication, each response team including ones of said plurality of agents; and organizing deployed mobile devices in an ad hoc peer-to-peer network passing incident related messages between neighboring peers in combined push/pull communications.

A computer program product for responding to incidents, said computer program product comprising a computer usable medium having computer readable program code stored thereon, said computer readable program code causing one or more computer executing said code to: receive in an operations center an indication of the occurrence of an incident in a locale, one or more computers providing said operations center, said operations center serving said locale; assign roles to mobile devices networked with said one or more computers, each mobile device being associated with one of a plurality of agents, each agent being associated with one of a plurality of individual departments serving said locale; monitor in said operations center for an indication of the occurrence of an incident; deploy one or more response teams responsive to said indication, each response team including ones of said plurality of agents; and organize deployed mobile devices in an ad hoc peer-to-peer network passing incident related messages between neighboring peers in combined push/pull communications.

A computer program product for responding to incidents, said computer program product comprising a computer usable medium having computer readable program code stored thereon, said computer readable program code causing a plurality of computers including provider computers executing said code to: plan and administer day-to-day operations for a plurality of locale departments by an operations center on a plurality of provider computers; plan and administer emergency operations for said plurality of locale departments by an emergency operations center (EOC) on said plurality of provider computers; generate a response plan for each identified incident from incidents identified from incident data and information from said plurality of locale departments; receive an indication of the occurrence of an incident in said locale; assign roles to mobile devices networked with said one or more computers, each mobile device being associated with one of a plurality of agents, each agent being associated with one of said plurality of locale departments, assigning roles comprising the EOC: providing said each mobile device with an assigned region of interest and a role model indicating including attributes describing said assigned role, said role model attributes providing information on performing a respective given role, providing said each mobile device with a likelihood table, said likelihood table mapping the interaction probability of each peer with other peers based on the respective peers' roles, and indicating roles and regions of interest associated with each peer to all peers across said ad hoc peer-to-peer network; monitor for an indication of the occurrence of an incident affecting said locale; deploy one or more response teams responsive to said indication, each response team including ones of said plurality of agents; and organize deployed mobile devices hierarchically according to role in an ad hoc peer-to-peer network passing incident related messages between neighboring peers in combined push/pull communications, wherein at least one deployed said peer remains connected to said EOC, said deployed mobile devices connecting wirelessly to each other in a said ad hoc peer-to-peer network, and wirelessly connecting a mobile device as a peer to said ad hoc peer-to-peer network comprises each said wirelessly connecting mobile device: connecting to neighboring peers, identifying said neighboring peers, and broadcasting role and region of interest associated with the connecting mobile device.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
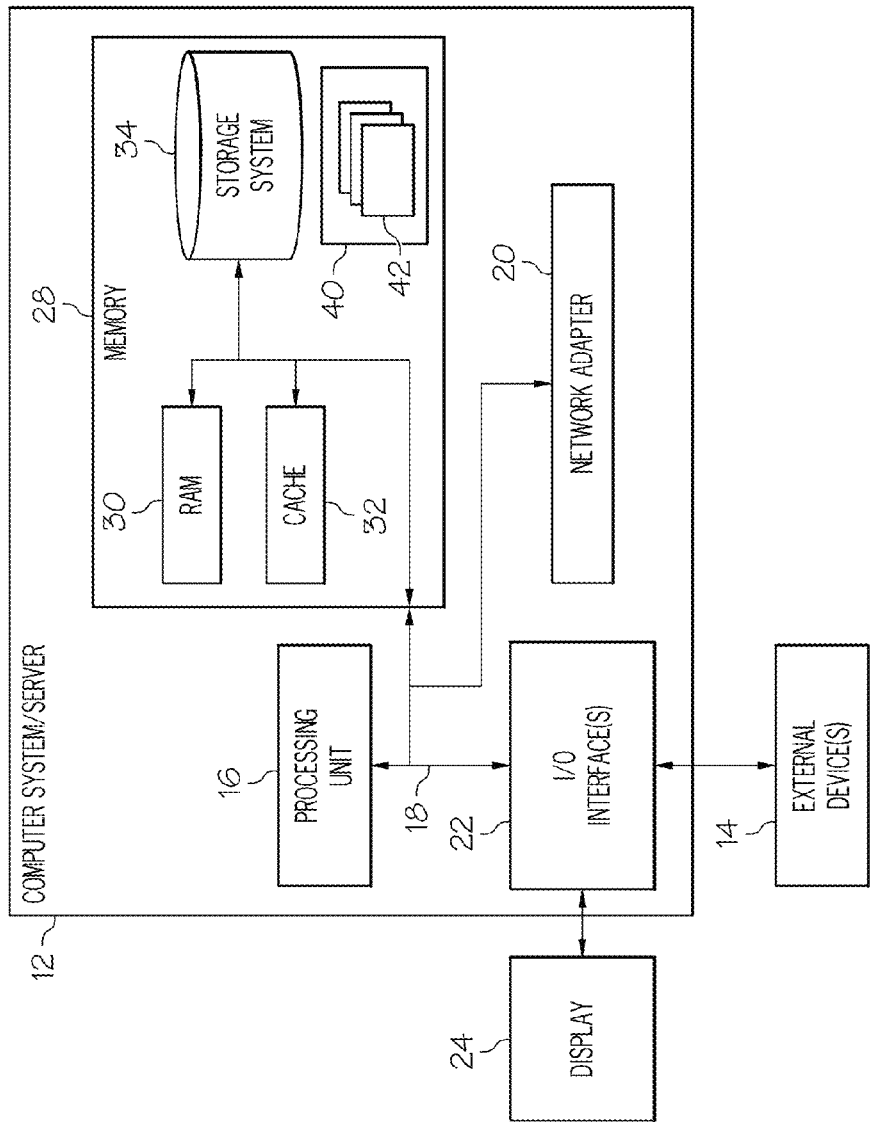
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Previously, however, this rapid elasticity frequently did not provision capabilities fast enough for responding to spreading effects of regional emergencies.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
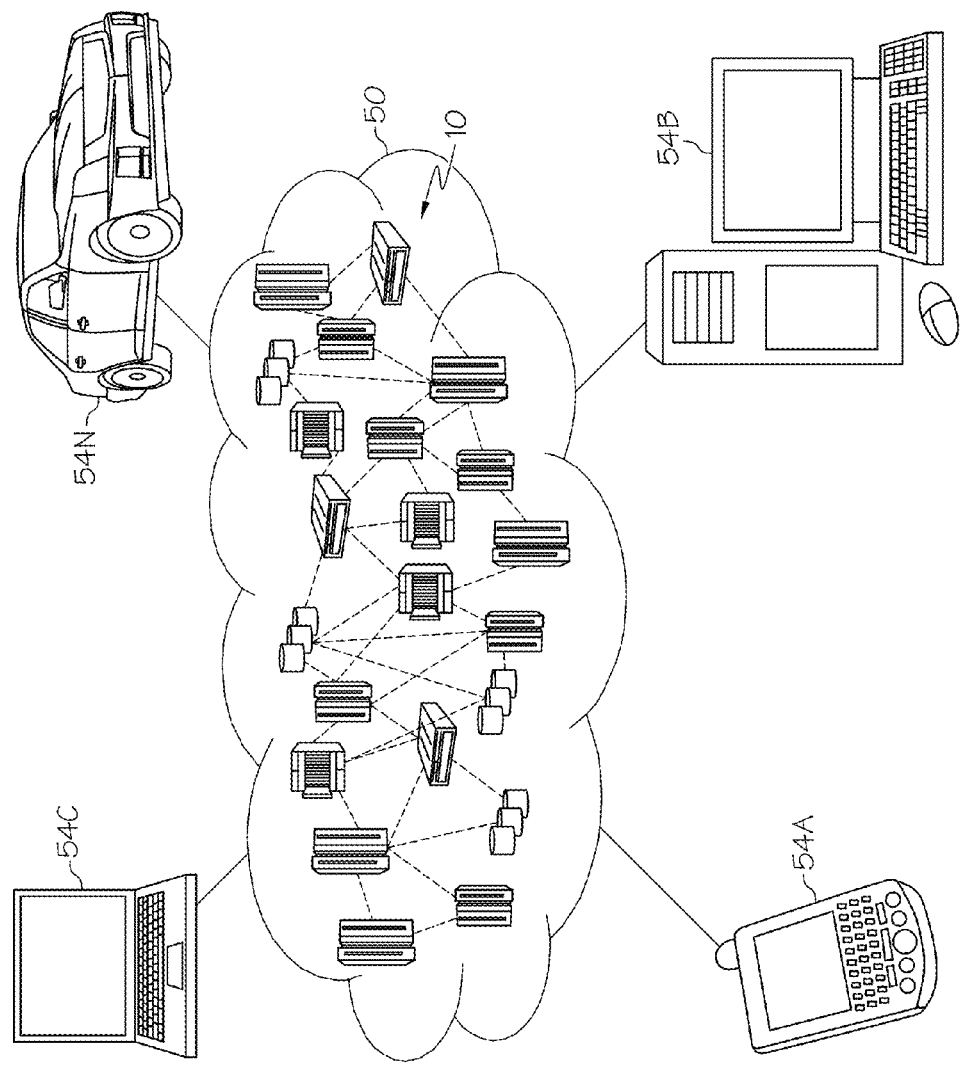
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
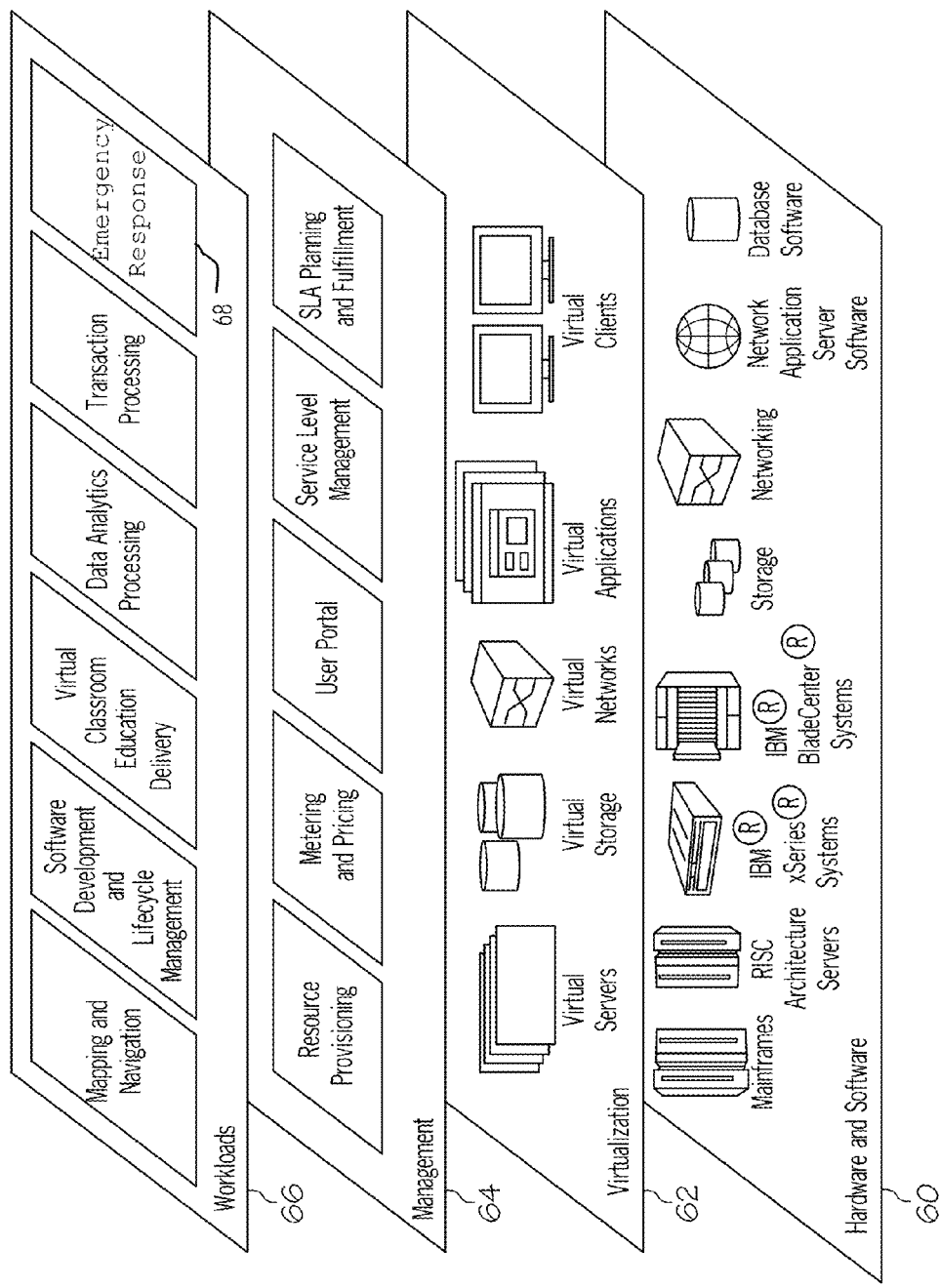
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and operations center 68.

Figure 4:
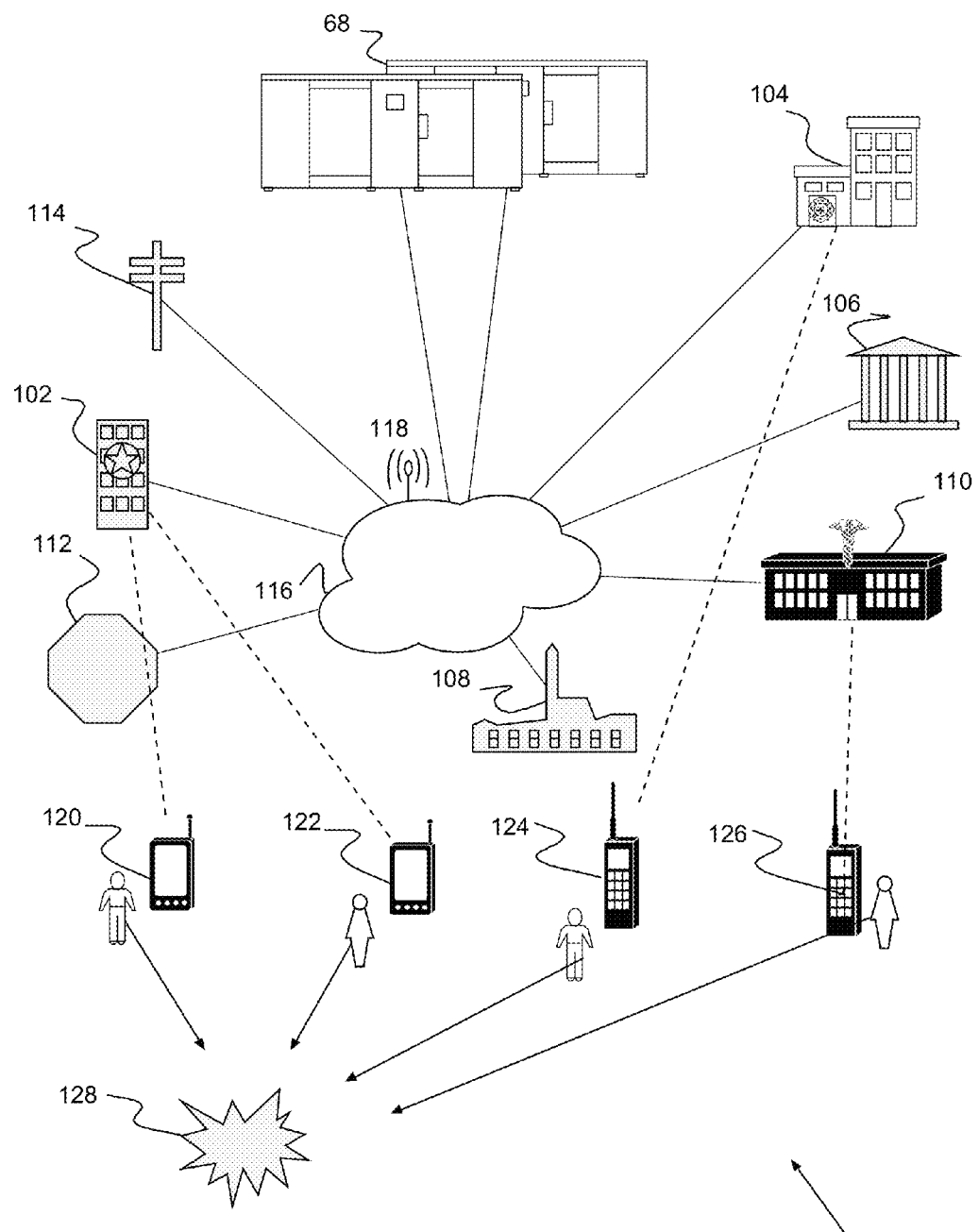
FIG. 4 shows an example of a preferred locale control and management system servicing a locale.

FIG. 4 shows an example of a preferred locale control and management system servicing a locale 100. For the locale 100 in this example, administration and/or service departments include law enforcement 102, fire protection 104, location administration (e.g., the mayor or a city/town manager and administrative offices) 106, weather forecasting 108, health services 110, transportation 112 and utilities 114 that are connected to network 116. Preferably, the network includes a wireless capability 118, e.g., a WiFi or cellular (Global System for Mobile Communications (GSM)) or a combination thereof, covering most, if not all, of the locale. An operations center 68, such as the IBM Intelligent Operations Center, is provisioned on one or more location operation services server(s) (such as server 10 in FIG. 1) connected over network 116.

Each department 102, 104, 106, 108, 110, 112 has employees, e.g., police, fire and rescue personnel, and medical personnel, equipped with mobile devices 120, 122, 124, 126, such as mobile device 54A in FIG. 2. During an exigent event 128, e.g., an emergency or any natural or man-made incident that may affect the functioning of the locale's infrastructure, some employees are deployed to the incident as agents and/or response team members. Deployed employees remain connected wirelessly to network 116 through mobile devices 120, 122, 124, 126, either individually through a WiFi or a cellular connection or, according to a preferred embodiment of the present invention, through each other in an ad hoc peer-to-peer network.

Preferably, the operations center 68 includes resources allocated for planning for, and administering to, day to day operations, and an emergency operations center (EOC) for planning and providing emergency response support for the locale, e.g., a city. Thus, the operations center 68 and EOC provide the departments 102, 104, 106, 108, 110, 112 with a real-time collaboration environment for planning, organizing, monitoring and sharing information.

Although as described herein, the operations center 68 provides the EOC, this is for example only and not intended as a limitation. Instead, for example, the EOC may be alone center in a stand-alone computer. Also, the server(s) may be located in a cloud environment, connected to the network 116, e.g., through the Internet, or in one or more a remotely or centrally located computer(s) connected to a local area network (LAN) 116, wired or wirelessly.

Figure 5:
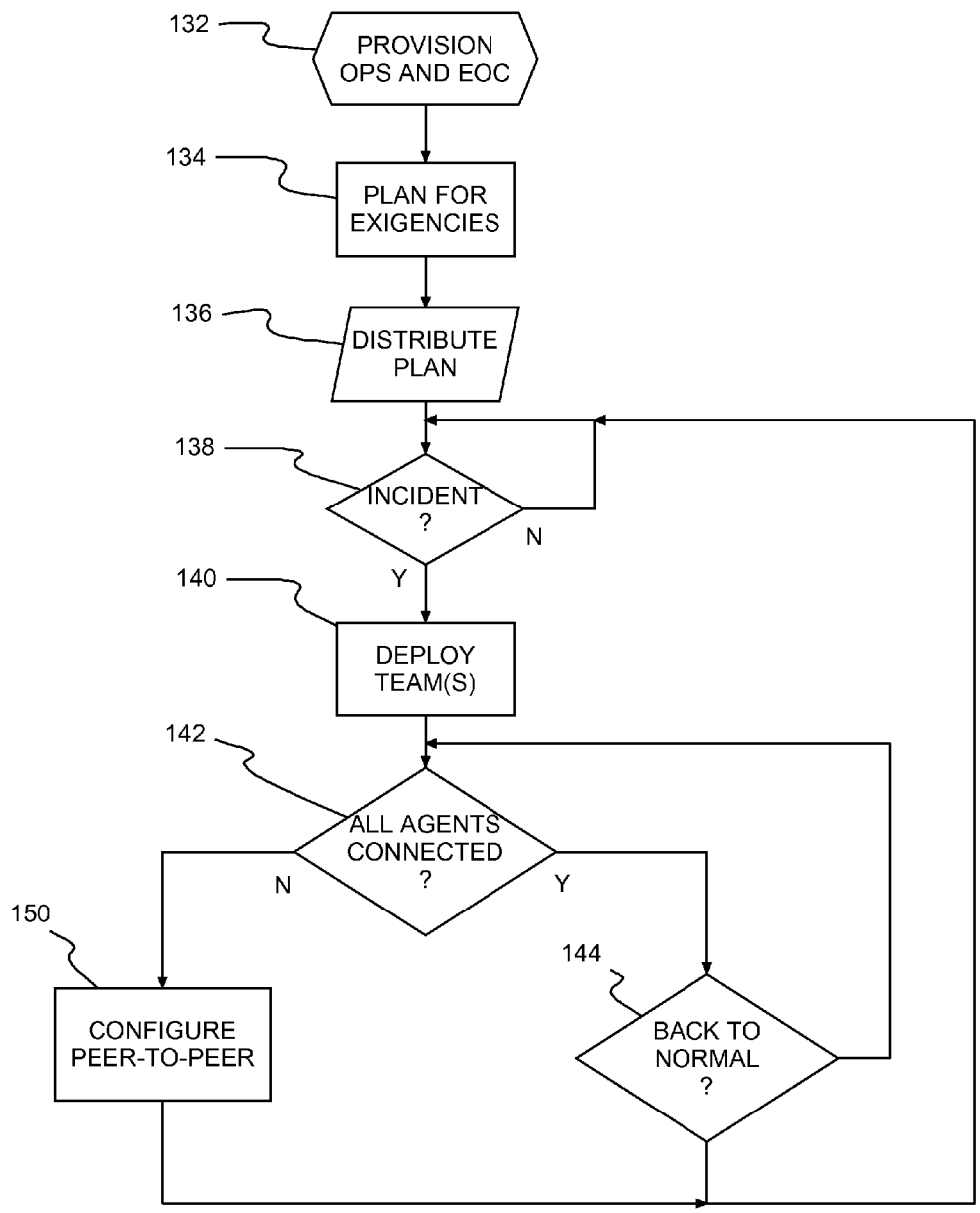
FIG. 5 shows an example of operations center and EOC operation according to a preferred embodiment of the present invention.

FIG. 5 shows an example of operations center 68 and EOC operation 130 according to a preferred embodiment of the present invention with reference to FIG. 4. When the operations center 68 and EOC are provisioned 132, individual departments 102, 104, 106, 108, 110, 112 provide data and incident information. The centers process the incident data and information and present the results 136 administration-wide. The EOC identifies and plans 134 for events 128 that may arise. When the EOC identifies 138 or forecasts an exigent incident (128 in FIG. 4), the EOC assigns and deploys agents 140 and disseminates information 142 to devices 120, 122, 124, 126, for each respective agent according to the agent's assigned role and region of interest.

As long as deployed devices 120, 122, 124, 126 remain directly connected 142 to network 116, the EOC directly manages the response to completion 144. If and when one or more devices lose connectivity 142, however, deployed devices 120, 122, 124, 126 join in an ad hoc, peer-to-peer network, connecting 150 each other to the EOC until the incident 128 is resolved 144 and the administration returns to normal. Optionally, rather than waiting for an interruption 142, devices 120, 122, 124, 126 may form 150 an ad hoc, peer-to-peer network as soon as they arrive on-scene instead of waiting for loss 142 of a direct connection. Devices 120, 122, 124, 126 in the ad hoc, peer-to-peer network communicate in a combined push/pull communication.

Data and incident information from departments 102, 104, 106, 108, 110, 112 include weather forecasts (e.g., flooding), infrastructure (e.g., traffic congestion and hospital capacity), law enforcement (e.g., police) and public safety (e.g., fire control) and utilities (e.g., water, gas and power). Planning 134 includes designating roles for employees or agents including designating some as emergency response team members to respond to exigent incidents 128, i.e., incidents that can affect locale infrastructure function. Thus roles are assigned by a combination of Role Based Access Control (RBAC) with Attribute Based Authorization Control (ABAC), such as described by Kuhn, et al., "Adding Attributes to Role-Based Access Control" IEEE Computer, vol. 43, no. 6, pp. 79-81, June 2010.

If and when the EOC identifies or predicts 138 such an incident 128 that, triggers deploying 140 the emergency response team(s) to handle the incident 128 and minimize the impact on the local population. Each deployed agent has a region of interest and a role described by attributes. Preferably, the attributes provide information on performing a respective given role. Typically, agents with similar roles or dependent roles are most likely to interact with each other. Also, agents in the same region are likely to be interested in information relevant to that region; while agents in other regions most likely are not. Thus, peers selectively forward information to peers based on each peer's likely interest.

For example, the role of a fireman is fire and rescue, i.e., to fight any fires and rescue any injured. Thus, firemen may need awareness of traffic conditions, hospital situations and number of potential victims. Similarly, doctor is to treat the injured and should receive information about the injured and hospital situations. These two roles in this example have some overlap, i.e., hospital situations and injured people. So, deployed, on-scene firemen share information related to those overlapping categories with deployed doctors. As described in further detail hereinbelow, when operating in an ad hoc peer-to-peer network, each device 120, 122, 124, 126 determines from assigned roles and attributes what information is disseminated to, or accepted from, neighboring agents.

When possible, however, team members' mobile devices 120, 122, 124, 126 directly connect with the EOC wirelessly, e.g., using GSM-like or Wi-Fi, to the network 116 for synchronizing required, up-to-date information to handle the incident. The EOC generates and provides information relevant to agents, such as weather forecasts, information on traffic conditions, possible blackouts, the number of people involved in the incident, affected areas, material and food items in need, and number of people in need of medical assistance. Agents in turn report about the incident in real time to the EOC.

Depending on the reports, the EOC may respond e.g., reallocating resources, deploying additional agents, and selectively closing services. These changes may well affect the agents' perception about the current state of city services, for example, and any future decisions the agents make regarding operational effectiveness. Moreover, since the information may be voluminous, individual agents may selectively receive only updates that affect each particular agent's context, e.g., current geographical region, activity and people involved. So until the incident resolution 144, each deployed agent must be kept up-to-date and synchronized with the EOC with pertinent information. on, for example.

Frequently, however, conditions may be such that one or more of the team member devices 120, 122, 124, 126 cannot connect 142 directly. For example, local circumstances may compromise local connectivity, e.g., local towers are down or power is lost in some areas. When direct connection is not possible 142, the agents operate autonomously 150, according to assigned roles; and respective mobile device or devices, e.g., 120, 126, form an ad hoc peer-to-peer network and connect(s) through the other devices 122, 124. Optionally, rather than wait for lost connection 142, local devices 120, 122, 124, 126 may form 150 an ad hoc, peer-to-peer network as soon as they deploy or arrive on-scene, local to each other. Thus, according to the present invention, deployed agents are more likely to be, and remain, synchronized with information used by the FOC; selectively disseminating current information to each other based on assigned roles, attributes and regions of interest; and further, efficiently exchanging information that the receiving agent may find most relevant in a completely decentralized, self-organized and fault-tolerant manner.

Figure 6:
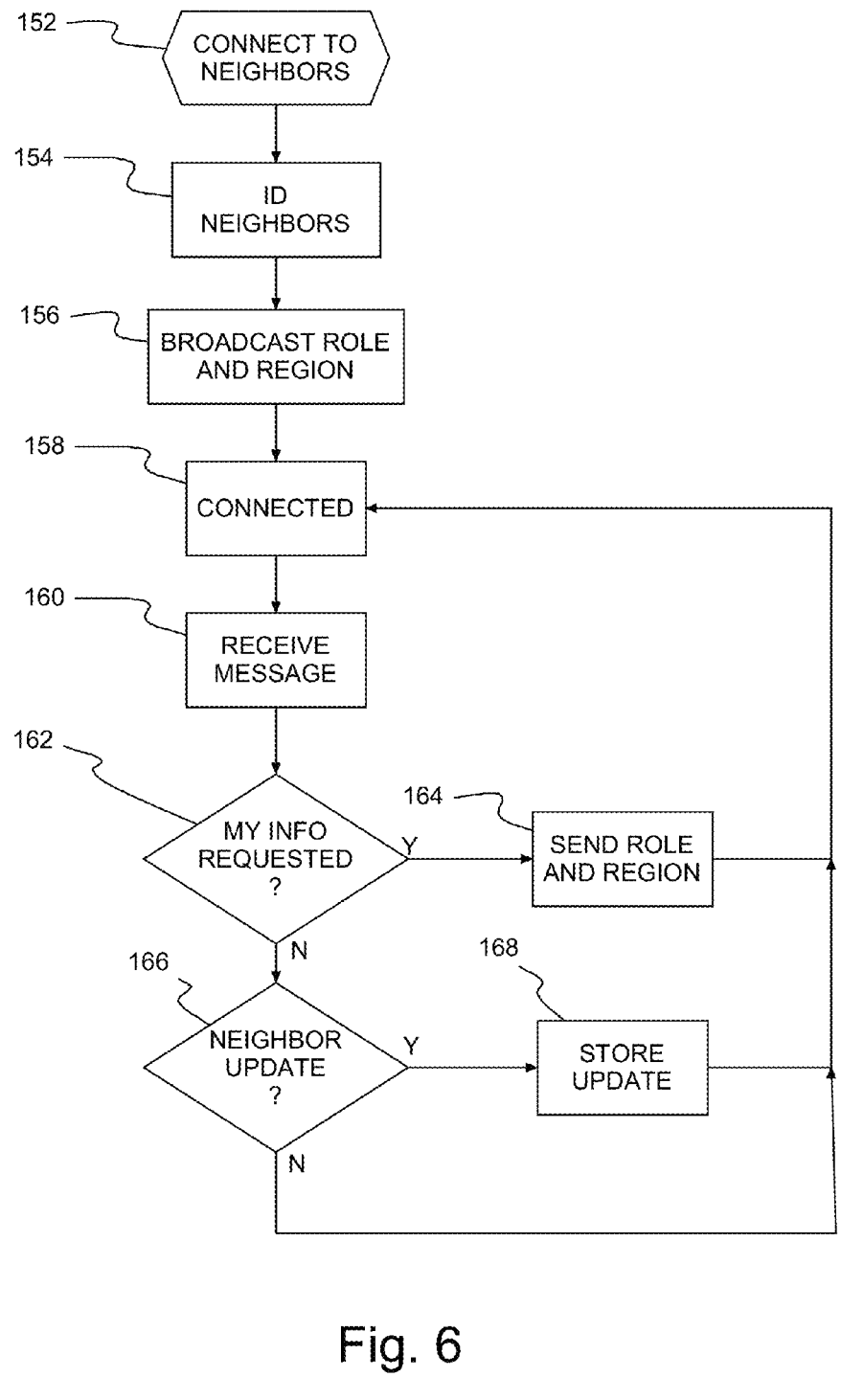
FIG. 6 shows an example of how agents join in and connect to an ad hoc, peer-to-peer network, according to a preferred embodiment of the present invention.

FIG. 6 shows an example of how agents join in, and connect to 150, an ad hoc, peer-to-peer network, according to a preferred embodiment of the present invention. As an agent begins connecting 152 as a peer, the agent's device requests and receives 154 a list of neighboring agents. Then, the device broadcasts 156 the particular assigned role and region of interest to neighboring devices. Once connected 158, each peer receives messages 160 from neighboring peers. The receiving peer determines if the agent's role information is being requested 162 by one or more neighboring peers. If so, the device sends 164 the particular role and assigned region of interest to the requesting peer(s). Once sent, the peer returns 158 to wait for the next message 160. If the message 160 is not a request for the peer's information, the peer checks 166 whether the message is an update of a neighboring peer's information. If so, the device stores 168 the update of the neighboring peer's role and assigned region of interest. After completing the update, or if the message 160 is not an update, the peer returns 158 to wait for the next message 160.

Peers may synchronize information using a combined push/pull approach. Communication is default push-based, where each peer receives some information from neighboring peers. If after a time-out, a peer has not received (pushed) information, the peer sends requests for (pulls) updated information to neighboring peers. Peers selectively disseminate and receive only information indicated as relevant to the recipient peer(s). This both improves accuracy, minimizing the number of false positives (i.e., a peer receiving a message with no related information), and reduces mission critical data handling and load requirements.

During normal periodic updates and information exchanges, the peers check with neighboring peers for more up-to-date information, and request updates for any stale information. Preferably, the peers use well known gossip methods to announce role and region of interest, and to maintain connectivity status up to date as well. Suitable examples of gossip methods are described by Jelasity et al., "The peer sampling service: Experimental evaluation of unstructured gossip-based implementations." *Proceedings of the 5th ACMIFIPUSENIX international conference on Middleware*, Volume: 3231, Pages: 79-98, Springer-Verlag New York, Inc., (2004); Zhong et al., "Non-uniform random membership management in peer-to-peer networks," IEEE INFOCOM (2005); and Chen et al., "Fast gossip-based overlay construction by adaptive membership exchange," *2nd International Conference on Networking and Digital Society*, vol. 1, pp. 21-24 (2010). Jelasity et al. and Zhong et al.

Whenever any device receives information from a neighboring peer, that device checks whether the incoming information is more recent than stored information, e.g., using a Time To Live (TTL) value, and updates stored information, if appropriate. So with each information push/pull, peers exchange fresh information with other peers assigned to the same region of interest and with the same, or overlapping or dependent, roles. After every update each device forwards the updated information to neighboring peers according to role and region of interest.

Figure 7A:
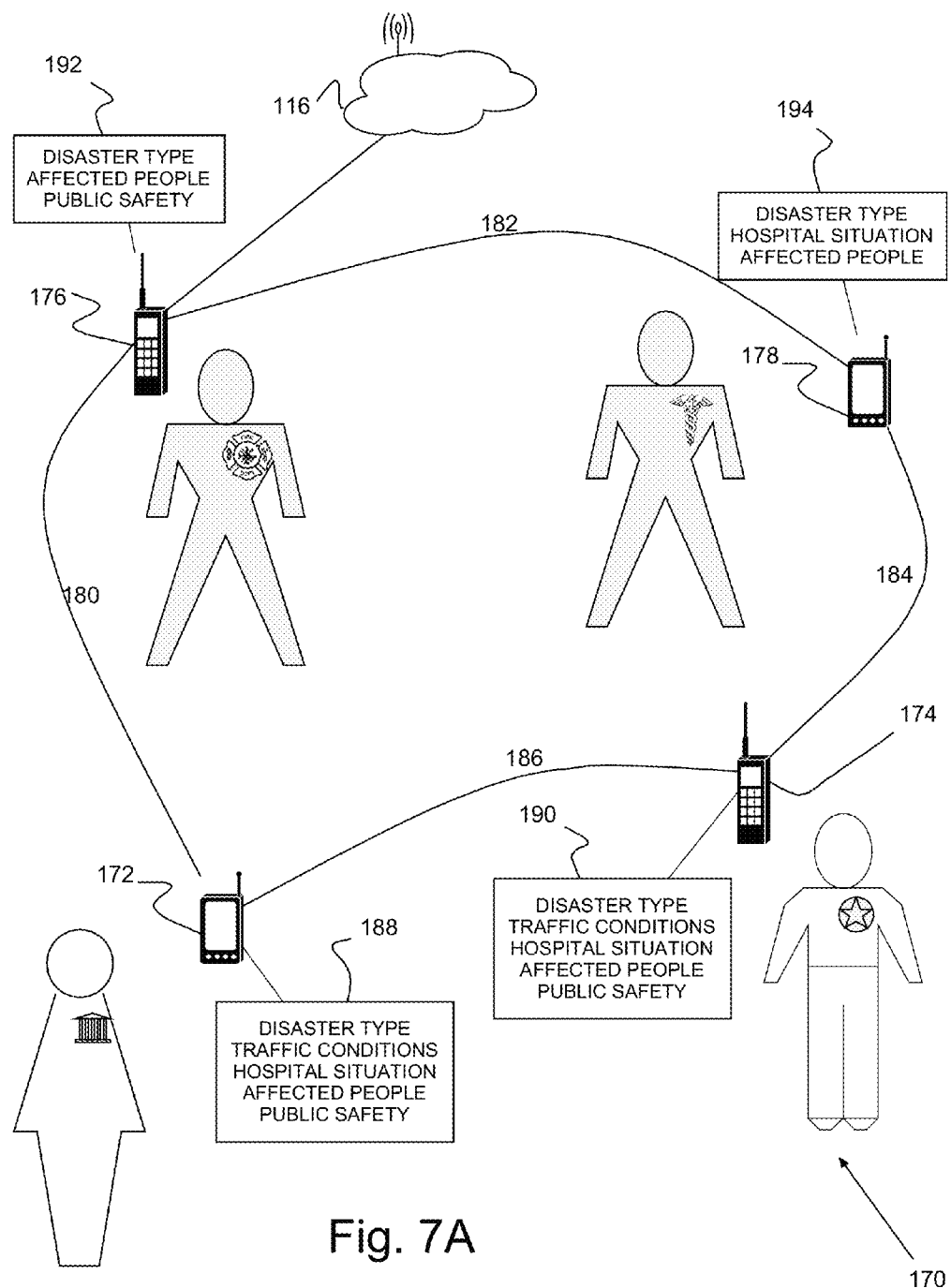
FIGS. 7A-B show an example a hierarchically organized peer-to-peer network and a representative fire and rescue role model.
Figure 7B:
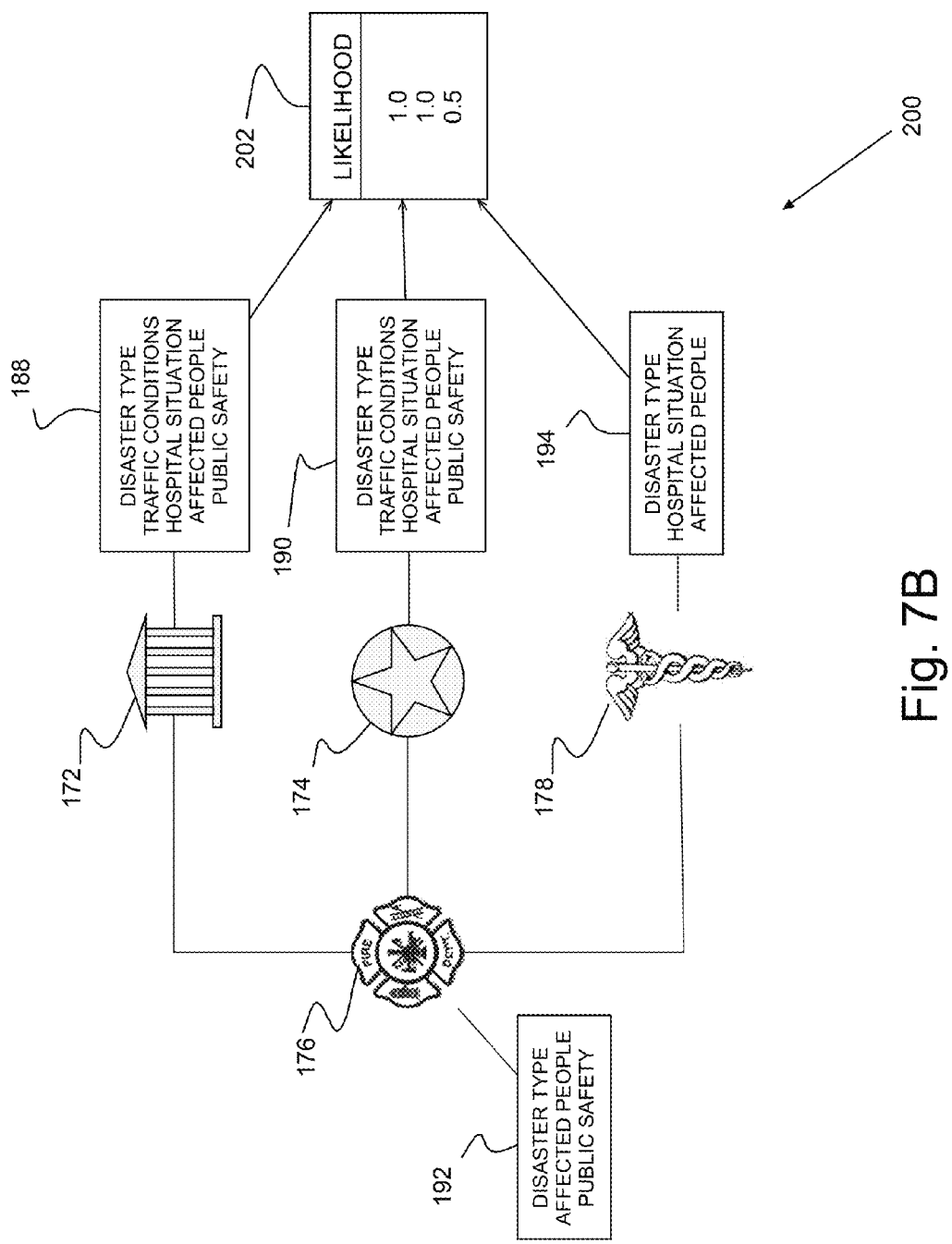

Furthermore, as shown in the peer-to-peer network 170 example of FIGS. 7A-B, peers 172, 174, 176, 178 are organized hierarchically by a hierarchy or role model, such as fire and rescue role model 200. In this deployment the peer-to-peer network 170 has a single connection through peer 176 to the EOC through network 116. Every peer 172, 174, 176, 178, includes a role model, such as fire and rescue role model 200, and deployed agents organize hierarchically according to role, following the hierarchy of the respective peer role models. An on-site operations officer 172 resides in an upper hierarchy level, and a law enforcement officer 174, a fire and rescue agent 176 and a doctor or emergency medical agent 178 reside in a next, lower hierarchy level. Peers 172, 174, 176, 178, each shown linked 180, 182, 184, 186 to a neighbor peer, are each associated with a set of attributes 188, 190, 192, 194 in the respective role models. Some roles in the same hierarchical level have overlapping attributes 188, 190, 192, 194. Reporting to/from the EOC passes through peer 176 to/from other peers 172, 174, 178.

In addition to the role model 200, every peer includes a likelihood table 202 mapping the likelihood of interaction with other peers based on the respective peers' roles. Each likelihood may be determined from overlapping attributes. Every peer 172, 174, 176, 178 starts with a likelihood table 202 based on the role model 200. Each table 202 is updated dynamically. Every peer 172, 174, 176, 178 stores the history of interactions with other peers 172, 174, 176, 178, and uses that history to update the likelihood information and refine the likelihood model on the fly.

An attribute overlap indicates agents with a probability of a common interest in some information. So, for example, the roles for the fire and rescue peer 176 and emergency medical peer 178 overlap with the attribute "affected people." Therefore, all information received by the fire and rescue peer 176 should be forwarded to a police peer 174 and operations officer peer 172. A medical peer 178 and a fire and rescue peer 176 have an interest in some of the same information; and the likelihood is 0.5, as they have a need to know the number of people affected.

The typical role of law enforcement is controlling the emergency situation. So, both the operations officer and deployed police officers are interested in all information for the area that is collected by all of the other agents from various departments. The police peer 174 has a likelihood of 1.0 indicating an interest in the same information as the fire and rescue peer 176. So for this example, police attributes 190 overlap both fire and medical attributes 192, 194 completely; while the fire and medical attributes 192, 194 partially overlap police attributes 190.

Link 180 may be lost, for example, because peers 176 and 172 move out of range of each other. Peer 176 no longer has access to information from operations peer 172. During the pull phase, peer 176 discovers that neighbor peer 178, initially defined with low likelihood (attribute overlap), is linked to, and provides an indirect path to, police peer 174. Police peer 174 has a higher likelihood, and shares common interests. In this example, the peers 174, 176, 178 in the path update their interaction history and likelihood tables to indicate information passing through the indirect path. Each peer pushes information to neighbors based on the probability of interest.

FIGS. 8A-D is an example showing how peers 174, 176, 178 dynamically update likelihood information. Initially in FIG. 8A, a medical peer 178 pushes information through direct link 210 to fire and rescue peer 176 with an initial probability of 0.5 in likelihood table 212. The medical peer 178 pushes information indirectly to law enforcement peer 174 through link 214 to fire and rescue peer 176, also with an initial probability of 0.5 in likelihood table 216.

As noted hereinabove, every peer 174, 176, 178 has information about all roles and attributes assigned to each peer 174, 176, 178. The roles are structured hierarchically, based on an organizational chart in the emergency operations center 68. In this example, the fire and rescue peer 176 and medical peer 178 are in a lower level than law enforcement peer 174. Also in this example, the lower level fire and rescue and medical roles share some common attributes. So, the lower level fire and rescue and medical roles inherit attributes from higher level law enforcement roles. Also, the higher level law enforcement peer 174 maintains awareness of all information collected by all peers 174, 176, 178.

Figure 8A:
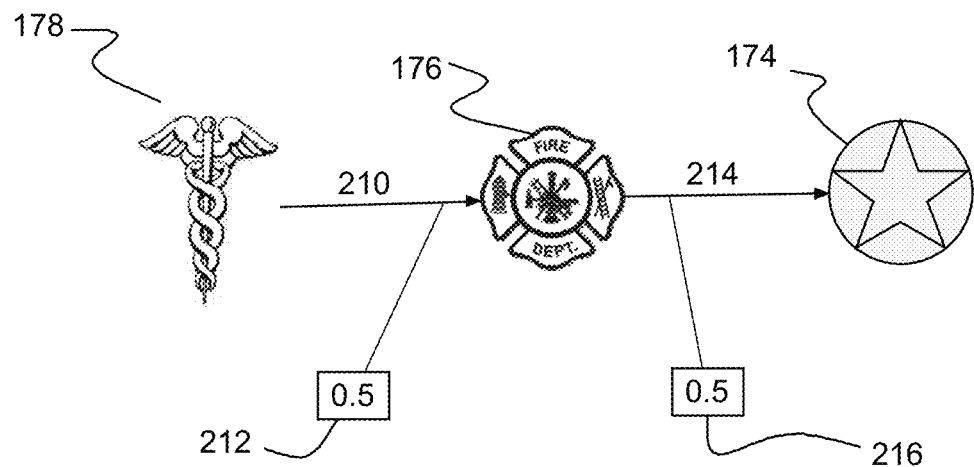
FIGS. 8A-D show an example of peers dynamically updating likelihood information.
Figure 8B:
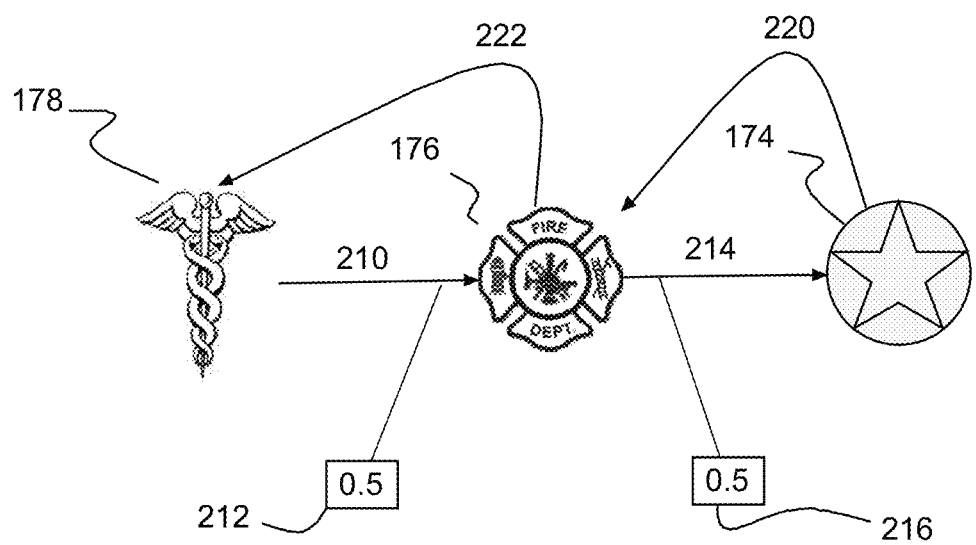

In FIG. 8B the law enforcement peer 174 requests information in a pull-based request 220 to the fire and rescue peer 176. The fire and rescue peer 176 takes the necessary actions and forwards the request 222 to the medical peer 178. During this pull-based request transaction the fire and rescue peer 176 and the medical peer 178 both update their interaction tables. The medical peer 178 has increased the number of interactions with the fire and rescue peer 176, because information to the law enforcement peer 174 must pass through the fire and rescue peer 176.

Figure 8C:
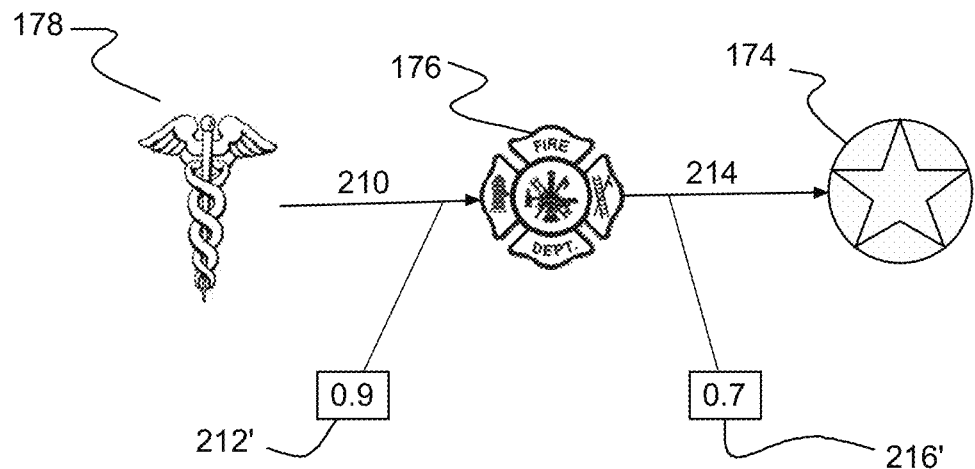

So as shown in FIG. 8C, the peers 174, 176, 178 update probabilities in likelihood tables 212', 216' accordingly. As the fire and rescue peer 176 receives information from the medical peer 178, the fire and rescue peer 176 increases the probability in likelihood table 216' for the law enforcement peer 174. Also, all information that the medical peer 178 forwards to the fire and rescue peer 176, information may be of interest to either or both of the fire and rescue peer 176 or the law enforcement peer 174. So, the medical peer 178 further increases the probability in likelihood table 212' for the fire and rescue peer 176.

Figure 8D:
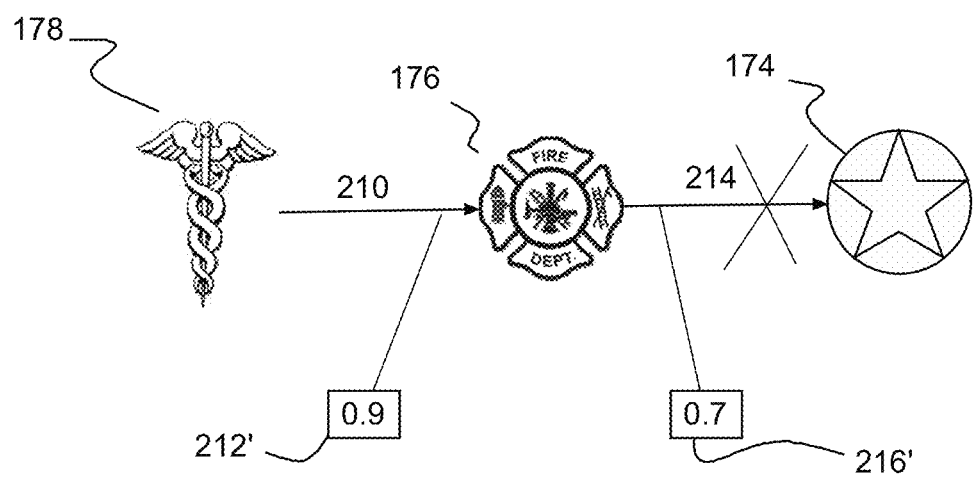

As shown in FIG. 8D, in an intermittently connected peer-to-peer network, the affected entries in the likelihood tables are restored to initial values whenever a connection between peers is interrupted. So in this example, link 214 is lost and the fire and rescue peer 176 and law enforcement peer 174 are no longer connected. When the link 214 opens, the fire and rescue peer 176 resets the probability in likelihood table 216' to 0.5. Then, the fire and rescue peer 176 forwards a message to neighboring medical peer 178, which resets the probability in likelihood table 212' as well.

Thus advantageously, team members deployed to address an exigency remain at least partially synchronized with a preferred EOC and across teams, even where network infrastructure is severely compromised. Further, team members maintain synchronization and remain current with minimal reliance on compromised or overloaded networking technology, such as GSM or WiFi. Therefore, rescue teams have access to near up-to-date information even in situations where the connectivity to an operation center is difficult.

In addition, roles and regions of interest are replicated across teams of agents, increasing the likelihood of finding agents having certain key roles working in the field, and further, allowing selected agents to share more information. Moreover, agents share information related to the incident, self-filtered, using a combined push/pull approach. Thus, deployed agents limit information transfers to only what is necessary to keep themselves and neighboring agents up-to-date in each synchronization, guaranteeing keeping relevant and necessary information up-to-date and available for strategic decisions. Thus all deployed agents have access to substantially all information of interest, even when communications with the EOC are compromised or severely impaired.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. An incident response system comprising:
    a network;
    a plurality of local devices connected to said network, each local device being associated with a locale department;
    one or more computers connected to said network, said one or more computers including an operations center planning and administering day-to-day operations and emergency operations for said locale; and
    a plurality of mobile devices each associated with an agent of a locale department, each mobile device being assigned a role for responding to incidents by said operations center, said each mobile device including a likelihood table, an assigned region of interest, and a role model including attributes describing said assigned role, and connecting to said network individually when deployed, and
    whenever a direct network connection is unavailable to one or more deployed mobile devices, said deployed mobile devices connect wirelessly in an ad hoc peer-to-peer network organized hierarchically according to role, said one or more connecting to said network through peers and sharing information in a combined push/pull communication, all said deployed mobile devices returning to connecting to said network individually whenever a direct network connection becomes available to all.

2. An incident response system as in claim 1, wherein said operations center includes an Emergency Operations Center (EOC) configuring, assigning roles to, and providing likelihood tables to, said plurality of mobile devices, said EOC managing operation of said deployed mobile devices for responding to an incident during each said incident.

3. An incident response system as in claim 2, wherein said EOC provides said each mobile device with said region of interest and said role model.

4. An incident response system as in claim 3, wherein said role model attributes provide information on performing a respective given role, and said likelihood table maps an interaction probability of each peer with other said peers based on the respective peers' roles.

5. An incident response system as in claim 3, wherein roles and regions of interest associated with each deployed mobile device are replicated to all said peers across said ad hoc peer-to-peer network.

6. An incident response system as in claim 2, wherein all peers in said ad hoc peer-to-peer network wait for push communication messages by default, and whenever a peer fails to receive a push message within a selected period of time, in a pull communication said peer pushes a request to neighboring peers.

7. An incident response system as in claim 2, wherein said one or more computers are cloud computers, said operations center and said EOC being provisioned on said cloud computers, and wherein said plurality of local devices and said plurality of mobile devices are cloud clients.

8. An incident response system as in claim 2, wherein locale departments include law enforcement, medical and fire and rescue departments.

9. An incident response system comprising:
a network;
a plurality of local devices connected to said network, each local device being associated with a locale department;
one or more computers connected to said network, said one or more computers including an operations center includes and an Emergency Operations Center (EOC), said operations center planning and administering day-to-day operations for said locale, said EOC planning and administering emergency operations during each incident; and
a plurality of mobile devices each associated with an agent of a locale department, said EOC assigning each mobile device with a role for responding to incidents, each mobile device connecting to said network individually when deployed for an incident, wherein said EOC provides said each mobile device with a likelihood table, a region of interest and a role model including attributes describing said assigned role, and during said incident whenever a direct network connection is unavailable to one or more deployed mobile devices, said deployed mobile devices connect in an ad hoc peer-to-peer network organized hierarchically according to role, said peers sharing information in a combined push/pull communication, said one or more connecting to said network through peers, all said deployed mobile devices returning to connecting to said network individually whenever a direct network connection becomes available to all.

10. An incident response system as in claim 9, wherein all said peers in said ad hoc peer-to-peer network wait for push communication messages by default and whenever a peer fails to receive a push message within a selected period of time, said peer pushes a pull request to neighboring peers.

11. An incident response system as in claim 10, wherein said role model attributes provide information on performing a respective given role, and said likelihood table maps an interaction probability of each peer with other peers based on the respective peers' roles.

12. An incident response system as in claim 11, wherein said EOC replicates roles and regions of interest associated with each deployed mobile device in all peers across said ad hoc peer-to-peer network.

13. An incident response system as in claim 12, wherein said one or more computers are cloud computers, said operations center and said EOC being provisioned on said cloud computers, said plurality of local devices and said plurality of mobile devices are cloud clients and locale departments include law enforcement, medical and fire and rescue departments.

14. A computer program product for responding to incidents, said computer program product comprising a non-transitory computer usable medium having computer readable program code stored thereon, said computer readable program code comprising:
computer readable program code for associating each of a plurality of networked local devices with a locale department;
computer readable program code for planning and administering an incident operations center, assigning an incident operations role for responding to incidents to each of a plurality of mobile devices, each mobile device being associated with an agent of one said locale department, assigning including providing device a likelihood table, a region of interest, a role model including attributes describing said assigned incident operations role, and;
computer readable program code for connecting each of said plurality of mobile devices to a network individually to said incident operations center; and
computer readable program code for connecting deployed mobile devices wirelessly in an ad hoc peer-to-peer network self-organized hierarchically according to emergency operations role whenever a direct network connection is unavailable to any of said deployed mobile devices, one or more peers connecting to said incident operations center through other peers and sharing information in a combined push/pull communication, all said deployed mobile devices returning to connecting to said network individually whenever a direct network connection becomes available to all.

15. A computer program product for responding to incidents as in claim 14, wherein said incident operations center comprises an Emergency Operations Center (EOC) planning and administering said emergency operations for said locale and assigning each emergency operations role, said computer readable program code for said EOC further comprising computer readable program code for configuring and providing said likelihood table to said each mobile device, and managing operation of said plurality of mobile devices deployed for responding to an incident during each said incident.

16. A computer program product for responding to incidents as in claim 15, wherein said computer readable program code for said EOC comprises computer readable program code for providing information on performing a respective given emergency operations role.

17. A computer program product for responding to incidents as in claim 16, wherein said computer readable program code for sharing information in said combined push/pull communication, and wherein said likelihood table maps an interaction probability of each peer with other peers based on the respective peers' roles.

18. A computer program product for responding to incidents as in claim 17, wherein said computer readable program code for said EOC comprises computer readable program code for replicating emergency operations roles and regions of interest associated with each deployed mobile device to all peers across said ad hoc peer-to-peer network; and said computer readable program code for wirelessly connecting and sharing in said ad hoc peer-to-peer network comprises:
- computer readable program code for waiting for push communication messages until a time out, and
- computer readable program code for push a request to neighboring peers in a pull communication whenever a timeout occurs.

19. A computer program product for responding to incidents as in claim 17, wherein said one or more computers are cloud computers, said computer readable program code for planning and administering provisioning an operations center and said EOC on said cloud computers, wherein locale departments include law enforcement, medical and fire and rescue departments, and wherein said plurality of local devices and said plurality of mobile devices are cloud clients.

20. A computer program product for responding to incidents in a shared resource environment, said computer program product comprising a non-transitory computer usable medium having computer readable program code stored thereon, said computer readable program code comprising:
- computer readable program code for associating each of a plurality of networked local devices with a locale department;
- computer readable program code for an operations center planning and administering day-to-day operations for the locale;
- computer readable program code for an Emergency Operations Center (EOC) planning for emergency operations in cooperation with said operations center and administering emergency operations during each incident, for assigning a role for responding to incidents to each of a plurality of mobile devices, and for providing said each mobile device with an assigned region of interest, a likelihood table and a role model including attributes describing said assigned role, each mobile device being associated with an agent of one said locale department; and
- computer readable program code for connecting each of said plurality of mobile devices to said EOC through a network individually; and
- computer readable program code for connecting deployed mobile devices in an ad hoc peer-to-peer network self-organized hierarchically according to emergency operations role whenever a direct network connection becomes unavailable any of said deployed mobile devices, peers without a direct connection available connecting to said EOC through other peers and sharing information in a combined push/pull communication, all said deployed mobile devices returning to connecting to said network individually whenever a direct network connection becomes available to all.

21. A computer program product for responding to incidents as in claim 20, wherein said computer readable program code for said EOC comprises:
- computer readable program code for providing information on performing a respective given emergency operations role;
- computer readable program code for said EOC replicates emergency operations roles and regions of interest associated with each deployed mobile device; and
- computer readable program code for said ad hoc peer-to-peer network distributing associated said roles and regions of interest to all peers across said ad hoc peer-to-peer network, said likelihood table mapping an interaction probability of each peer with other peers based on the respective peers' roles.

22. A computer program product for responding to incidents as in claim 20, wherein said computer readable program code for connecting in said ad hoc peer-to-peer network comprises:
- computer readable program code for defaulting all peers in said ad hoc peer-to-peer network to wait for push communication messages until a time out; and
- computer readable program code for pushing a request to neighboring peers to pull updates from connected neighboring peers in a pull communication message whenever a peer fails to receive a push message within a selected period of time.

23. A computer program product for responding to incidents as in claim 20, wherein said one or more computers are cloud computers, computer readable program code for said operations center and said EOC provisioning said operations center and said EOC on said cloud computers, wherein locale departments include law enforcement, medical and fire and rescue departments, and wherein said plurality of local devices and said plurality of mobile devices are cloud clients.

\* \* \* \* \*